United States Patent
Roussie et al.

(10) Patent No.: US 10,760,360 B2
(45) Date of Patent: Sep. 1, 2020

(54) DEVICE FOR DETERMINING THE CONNECTION QUALITY OF A THREADED TUBULAR CONNECTION

(71) Applicant: VALLOUREC OIL AND GAS FRANCE, Aulnoye-Aymeries (FR)

(72) Inventors: Gabriel Roussie, Sugarland, TX (US); Nicolas Baudet, Le Quesnoy (FR); David Christian Petersen, Asgardstrand (NO)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 16/339,604

(22) PCT Filed: Oct. 17, 2017

(86) PCT No.: PCT/EP2017/076393
§ 371 (c)(1),
(2) Date: Apr. 4, 2019

(87) PCT Pub. No.: WO2018/073197
PCT Pub. Date: Apr. 26, 2018

(65) Prior Publication Data
US 2019/0242201 A1      Aug. 8, 2019

(30) Foreign Application Priority Data

Oct. 19, 2016   (FR) ...................................... 16 60122

(51) Int. Cl.
*E21B 19/16*      (2006.01)
*G01J 5/20*      (2006.01)
(Continued)

(52) U.S. Cl.
CPC .......... *E21B 19/165* (2013.01); *G01J 5/0205* (2013.01); *G01J 5/025* (2013.01); *G01J 5/041* (2013.01);
(Continued)

(58) Field of Classification Search
CPC ..... F16L 2201/10; E21B 19/16; E21B 19/165
See application file for complete search history.

(56) References Cited

U.S. PATENT DOCUMENTS

| 4,573,359 A | 3/1986 | Carstensen |
| 2002/0163181 A1 | 11/2002 | Russell |

(Continued)

FOREIGN PATENT DOCUMENTS

| JP | 6-129571 A | 5/1994 |
| JP | 6-221475 A | 8/1994 |

OTHER PUBLICATIONS

International Search Report dated Nov. 14, 2017 in PCT/EP2017/076393 filed Oct. 17, 2017.

*Primary Examiner* — Kipp C Wallace
(74) *Attorney, Agent, or Firm* — Oblon, McClelland, Maier & Neustadt, L.L.P.

(57) ABSTRACT

A device for determining the connection quality of threaded tubular components includes a case configured for mounting on an external surface portion of a threaded tubular component, at least one measuring device including a contact layer including a plurality of temperature sensors arranged to measure variables representative of temperatures at a plurality of locations E(i,j) of the external surface of the end of the tubular component.

19 Claims, 4 Drawing Sheets

(51) Int. Cl.
  G01K 1/02 (2006.01)
  G01K 1/14 (2006.01)
  G01K 7/02 (2006.01)
  G01K 7/16 (2006.01)
  G01J 5/04 (2006.01)
  G01J 5/08 (2006.01)
  G01J 5/02 (2006.01)

(52) U.S. Cl.
  CPC ............... G01J 5/044 (2013.01); G01J 5/048 (2013.01); G01J 5/0881 (2013.01); G01J 5/20 (2013.01); G01K 1/026 (2013.01); G01K 1/143 (2013.01); G01K 7/02 (2013.01); G01K 7/16 (2013.01)

(56) References Cited

U.S. PATENT DOCUMENTS

| | | | |
|---|---|---|---|
| 2004/0223533 A1 | 11/2004 | Dishaw et al. | |
| 2006/0114964 A1 | 6/2006 | Dishaw et al. | |
| 2007/0258504 A1 | 11/2007 | Enderweit | |
| 2011/0164244 A1* | 7/2011 | Honda | G01B 11/2433 356/72 |
| 2014/0334517 A1* | 11/2014 | Blundell | G01J 5/046 374/44 |
| 2015/0204752 A1* | 7/2015 | Miller | G08B 21/18 29/407.05 |
| 2017/0321502 A1* | 11/2017 | Rose | G01N 29/14 |

* cited by examiner

DEVICE FOR DETERMINING THE CONNECTION QUALITY OF A THREADED TUBULAR CONNECTION

The invention relates to the field of threaded tubular connections, and more precisely to an accessory for determining the connection quality of threaded tubular connections.

The term "threaded tubular connection" means two tubular components connected together by threadings, a "component" possibly being any element or accessory used to drill or operate an oil and/or gas well and comprising at least one connection or coupling, or else a threaded end.

The component may be a relatively long tubular element (in particular approximately ten metres in length), for example a tube, or else a tubular coupling several tens of centimetres in length, or else an accessory for these tubular elements (a hanger, a cross-over, a safety valve, a tool joint, a sub or the like). These components are generally produced from steel. The device is particularly suitable for elements produced from stainless steel, those with a high chromium content such as 13Cr or CRA steels; these steels are particularly sensitive to galling.

The components are generally connected one to another for dropping into the hydrocarbon well or similar well and to constitute a drill string, a casing string or liner string, or else a tubing string (operating strings).

The API 5CT specification issued by the American Petroleum Institute (API), equivalent to ISO standard 11960: 2004 from the International Standardization Organisation (ISO), governs tubes used as casing or tubing, and API specification 5B defines standard threadings for these tubes.

API specification 7 defines threaded connections with a shoulder for rotary drill stem elements.

The manufacturers of components of threaded tubular connections have also developed threaded connections known as premium connections which have specific geometries for the threadings, and specific means providing them with better performances in service, in particular as regards mechanical strength and seal and corrosion resistance, in particular as regards sulphides.

The components cited above may comprise a threaded male end for making up into a threaded female end of another drilling or operating component, forming a connected connection which must have high mechanical integrity and a seal under very high mechanical loads, as well as resistance to corrosion. Thus, it is vital that their male and female ends should be damaged, polluted or deteriorate as little as possible between the time they leave their production line and that when they are used, but also between two successive uses. The use of protectors means that not only the threading, but also any sealing surfaces and abutments which each have specific and complementary functions of these elements can be protected against corrosion, dust and shocks (or knocks), in particular as regards ensuring a seal in the service phase. However, the situation might arise wherein one end is degraded without it being possible to detect this occurrence before connection. It is also possible for the elements to be connected to be positioned incorrectly at the time of connection. There is then a risk of galling during connection, resulting in possible unwanted plastic deformations, localized peeling of material at a portion of a threading, or even at other functional surfaces such as an abutment or a sealing surface. Galling of this type may result in degradation of the mechanical qualities or the sealing qualities of the connection.

Thus, there is a need for detecting the appearance of galling between functional surfaces during connection of two ends of tubular components.

The prior art, in particular the document JP 6-221475, already discloses a method for inspecting the makeup status of a threaded tubular connection in which, during the makeup operation, the amplitude of the torque is analyzed as a function of the number of makeup rotations carried out. The variation in the torque is used to detect the appearance of galling. However, that method may give rise to erroneous interpretations, in particular because the variation in the makeup torque depends on the actual dimensions of the threadings within their machining tolerances. In addition, that method is generally based on reaching a threshold value for the torque as a function of the degree of progress of makeup, and fixing that threshold value is the result of a compromise between the possibility of detecting all cases of the occurrence of any galling during coupling and the frequency of detection of "false positive" results, an expression which means that carrying out the method has resulted in a diagnosis of galling when in actual fact galling has not occurred during connection. It is also possible for the occurrence of any galling during connection to generate a change in the makeup torque which is similar to a desired result but without the functional surfaces such as the abutment or sealing surfaces being at the origin of the torque generated: galling is not detected by the method of JP 6-221475 and the connection which is formed is not sealed.

The present invention improves the detection of the phenomenon of galling while minimizing "false positive" detections.

The Applicant has observed that the plastic deformations and peeling of material which occur during galling generates warming. Furthermore, the makeup operation as such generates heat, in particular because of the surfaces rubbing one against the other. This is the case, for example, with the thread roots, the sealing surface, or other functional surfaces of the threaded end. This warming is localized but, because of heat conduction inside the material of the threaded end, this warming causes a variation in temperature within the end up to an external surface of the end.

Thus, it should be possible to detect galling by a method and a device which measures the change in temperature during makeup of two threaded ends, and which is capable of detecting from these measurements whether a change in temperature is caused by the appearance of galling.

The Applicant has developed a device which is capable of measuring the variations in temperatures at several points of an outer surface of an end, in a manner such that this device may be used by operatives on an oil well platform.

An object of the present invention is a device for determining the connection quality of threaded tubular components, comprising:

a case (2) comprising a cylindrical internal space (20) having an axis (21) and configured to be mounted on an external surface portion of a threaded tubular component;

at least one measuring means (3) between the case (2) and the internal space (20), comprising a contact layer (4) comprising a plurality of temperature sensors (5) arranged in order to measure variables representative of temperatures at a plurality of locations E(i,j) of the external surface of the end of the tubular component;

first acquisition electronics (33) connected to a plurality of sensors (5) and capable of processing at least a portion of the signals generated by the sensors (5).

In one embodiment, the at least one measuring means (3) comprises a plurality of measuring strips (31) distributed about the axis (21) of the device.

In an embodiment according to the invention, the device is a stabbing guide for tubular components for oil operations.

Said temperature sensors (5) may be selected from thermocouples, thermistors and microbolometers.

Said temperature sensors (5) may be distributed in arrays (51) of temperature sensors (5) on a flexible substrate.

In an embodiment, the temperature sensors are thermistors and the flexible substrate is formed from polyimide.

The contact layer (4) may comprise a thermally conductive and electrically insulating layer disposed at least in part between the temperature sensors (5) and the internal space (20).

The contact layer (4) may comprise a protective layer (41) disposed so as to protect the temperature sensors (5).

The protective layer (41) may be a sheet of steel shaped to provide a rounded profile.

In an embodiment, the device may comprise a cushioning layer (9) between the case (2) and the contact layer (4).

The cushioning layer (9) may comprise elastic means selected from garter springs, Clover Dome spring rings, corrugated rings, a domed spring, an elastic material, and a neoprene or silicone foam.

Said cushioning layer (9) may comprise a rigid profiled element (92).

The case (2) may comprise a positioning abutment (7).

In an embodiment, the first acquisition electronics (33) may comprise a plurality of acquisition electronics units (34) connected to collection electronics (35) of the FPGA programmable electronic circuit type.

In an embodiment, the device may comprise a second processing electronics (36) capable of determining the appearance of galling or the deterioration of at least a portion of an element of a tubular connection during makeup of two threaded tubular components in accordance with at least one time-based detection function.

Said first acquisition electronics (33) and said second processing electronics (36) may be connected via a wireless wifi or Bluetooth link or a wired Ethernet type link.

The second processing electronics may comprise software for processing and storing the measurements.

The invention is also a method using the device according to the invention, comprising the steps of:
  determining a set of values $T_0(i,j)$ which are representative of temperatures at a plurality of locations $E(i,j)$ of the external surface of one end (11) of a tubular component at the start of making it up with another corresponding tubular component;
  determining another set of values $T(i,j)$ representative of temperatures at a plurality of locations $E(i,j)$ of the external surface of one end (11) during makeup;
  calculating the difference between the temperature during makeup $T(i,j)$ and the temperature at the start of makeup $T_0(i,j)$ for each location $E(i,j)$;
  issuing a diagnosis of galling when the difference $T_0(i,j)-T_0(i,j)$ exceeds a predefined threshold $\Delta T_{threshold}(i,j)$ for at least one location $E(i,j)$.

In a variation, the inventive method may further comprise the step of:
  computing the rate of variation of temperature $V_T(i,j)$ for at least one set of locations $\Sigma E(i,j)$;
  issuing a diagnosis of galling when the variation in temperature $V_T(i,j)$ exceeds a predefined threshold of variation $\Delta V_T(i,j)$.

Further characteristics and advantages of the invention will become apparent from an examination of the detailed description below and the accompanying drawings, in which.

The accompanying drawings may not only act to complete the invention, but can also contribute to its definition, if appropriate. They do not limit the scope of the invention.

The aim of the invention is to determine the connection quality of two threaded components by detecting the appearance of damage in a portion of threading and/or a sealing surface and/or an abutment during connection of two threaded ends of tubular components to form a threaded connection.

The term "female end" means the portion of a component provided with machined and/or precision ground surfaces with a view to forming a connection with a corresponding male portion, and the term "body" means the portion of a component located beyond this and provided with surfaces which are generally provided by rolling. A female end generally has one or more threading(s) located on an internal side wall and is configured for connection to a corresponding "male end" with one or more corresponding threading(s) on an external side wall of the component.

Figure 1:
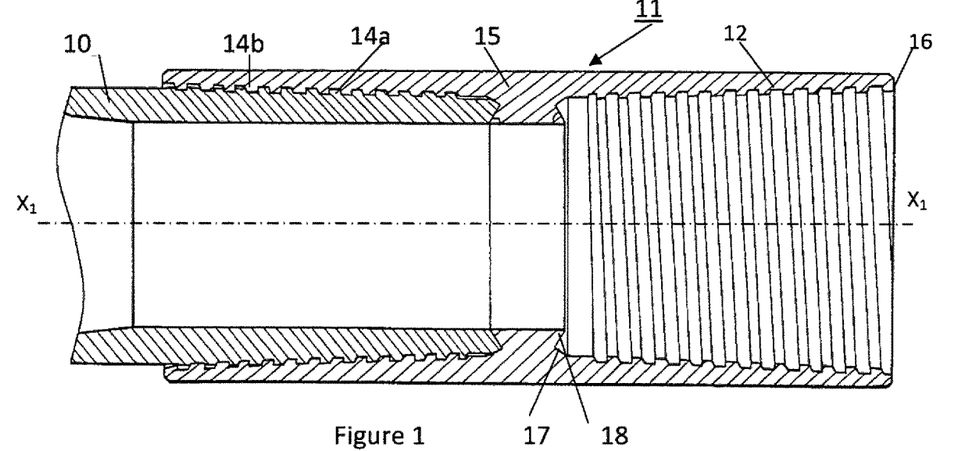
FIG. 1 diagrammatically shows a portion of a threaded tubular component and one of its ends.

FIG. 1 shows a tubular component (10) and a female end or connection (11). The end is provided with a threading (12) and may also comprise a sealing surface (17), and an abutment (18). Certain connections may comprise a plurality of threadings or sealing surfaces or abutments. The tubular component shown is of the "threaded and coupled" type. In fact, it comprises a tube (10) provided with a first outer threading (14a), and a coupling (15) provided with a second inner threading (14b) which can be made up onto the first outer threading (14a) of the tube (10).

The coupling (15) comprises a threading (12) intended to be made up onto one end of another tubular component. In FIG. 1, the coupling comprises a female end of the tubular component (10) and is intended to be made up onto a male end of another tubular component. The threading (12) may be different from the second inner threading (14b); in other words, the coupling is not necessarily symmetrical. The coupling (15) also comprises a field end (16).

Alternatively, tubular components known as "integral" components exist which do not include a coupling, on which the two ends, male and/or female, are formed directly.

A threading (12) may comprise at least a portion said to have perfect threads, and the threading may also comprise one or more portions said to have imperfect or vanishing threads. The imperfect threads can be used to reduce the bulk of the threaded connection and/or to allow better movement of any grease deposited on the connections before connection.

The phenomenon of galling has a number of aspects. Firstly, it might affect the various functional portions of the connection: the threading, at the perfect or imperfect threads, a sealing surface, or an abutment. Secondly, galling may be characterized by its extent: it might concern a surface of a part of a thread portion, for example by material having peeled over a few centimetres at a stabbing flank of a single perfect thread, but in more severe cases it might also concern damage to several consecutive threads over an angular sector of the threading; as an example, galling might be constituted by deterioration of 5 consecutive threads over an angular sector of 15°.

Galling may also be characterized by its intensity. Very slight galling might allow connection of the components to be re-attempted directly; slight galling might mean that manual repairs to the damaged surface and a second attempt at connection could be carried out on site; medium galling which involves peeling of material will lead no rejection of the tubular component concerned: severe galling, which involves peeling of material with deterioration of the geometry of the functional surfaces, will result in rejection of the tubular component concerned.

The components supplied to a well will have been transported, handled and stored in aggressive environments, which means that connection of components is not carried out under conditions that are as ideal and controlled as in a factory environment. The components could be improperly positioned with respect to each other just before connecting them. These external factors might cause the appearance of connection defects; the probability is low, but the consequences are very severe as regards the integrity of the drill string and the gas or oil well being operated.

In an oil well being drilled or operated, the components are connected one after the other to the last component of the string, this latter being dropped gradually down the well. Usually, a component is placed in a vertical position for connection, and then it has a top end and a bottom end which is intended to be connected to a top end of the last component introduced into the string. During this operation, the component is generally held and suspended via its top end. It is guided by an operative who manipulates its bottom end.

In order to limit swinging of the component, and to avoid shocks, in particular on the functional portions of the ends to be connected together, makeup guides are routinely used.

A makeup guide (normally known as a "stabbing guide" in the technical field of tubular components for gas and oil wells) generally comprises a conical guide portion which is intended to bring a male end into position for connection to the corresponding female end. This device is also intended to protect the threading of the male end from shocks during the approach phase. The U.S. Pat. No. 4,599,778 describes a stabbing guide of this type.

The Applicant has discovered that integrating the device of the invention into a stabbing guide is particularly useful, because this means that the number of pieces of equipment and operations to be carried out when connecting tubular components can be reduced, and because it has the effect of reducing the risks of poor positioning of the device in accordance with the invention.

Figure 2:
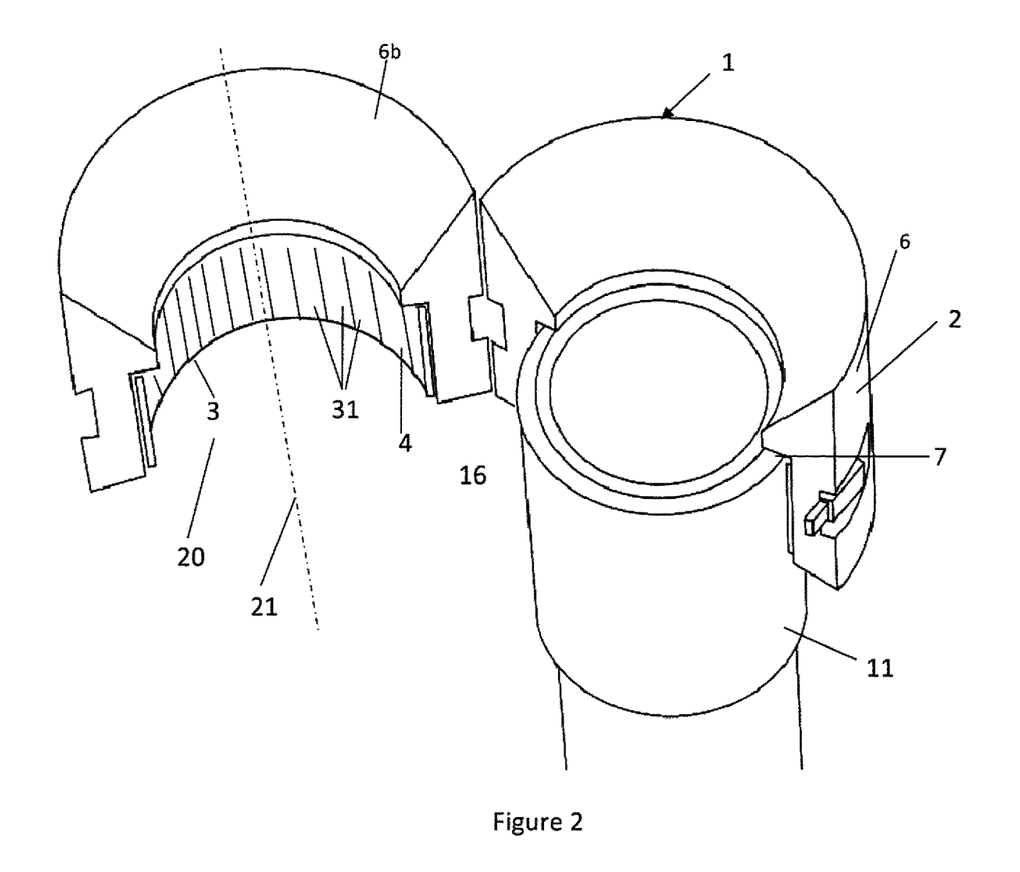
FIG. 2 shows a partial perspective diagrammatic drawing of one embodiment of the device in accordance with the invention placed around the female end of a threaded tubular component in the open position.

The connection device (1) of the invention of FIG. 2 comprises a case (2) which can be positioned and mounted on one end of a tubular component (11). The case (2) has an axis (21) and a substantially cylindrical internal space (20) which can receive a portion of a cylindrical tubular element.

The case (2) is generally produced in two portions in order to facilitate its manipulation around a tubular element. The two portions may be mounted so as to pivot with respect to each other.

The case (2) may comprise a positioning abutment (7) for proper positioning, in particular axial, of the case (2). When the device is intended to be used on threaded and coupled type connections, the positioning abutment (7) is disposed so that it can bear on the field end face (16). The positioning abutment (7) may be used to axially position the device in a repeatable manner, and thus to know with greater precision the axial positioning of temperature sensors (5) (not visible in FIG. 2) with respect to the functional surfaces of the connection.

The connecting device (1) also comprises a measuring means (3). The measuring means (3) has a substantially cylindrical internal shape in a manner such as to be close to the shape of the external surface of the end of the tubular component (11), or indeed in order to be able to match the shape of the external surface of the end of the tubular component (11). The measuring means (3) is thus positioned between the case (2) and the internal space (20).

The measuring means (3) comprises at least one measuring strip (31). FIG. 2 represents several measuring strips (31). The measuring strips (31) are generally distributed in a manner such as to cover a large portion of the external lateral surface of one end. Each measuring strip (31) comprises a contact layer (4) comprising a plurality of temperature sensors (5) intended to measure variables which represent temperatures at a plurality of points on the external surface of the end of the tubular component (11). The contact layer (4) integrated into the case (2) has the advantage of providing a compact solution and of not taking up space on a platform compared with a system of thermal cameras. This has a number of advantages: a system using thermal cameras would require three thermal cameras to carry out 360° measurements around a tubular component, is difficult to use on site, and the cameras could be masked by tools or operatives. In addition, the contact layer (4) is protected by the case (2) from external heat radiation due to the operatives, the sun, or to equipment around the well.

The measuring strips (31) of the embodiment of FIG. 2 are disposed vertically and distributed radially. Alternatively, they could be disposed horizontally and distributed axially. The vertical arrangement has the advantage of producing identical measuring strips between them for devices adapted to different external diameters of tubes or ends.

Figure 5:
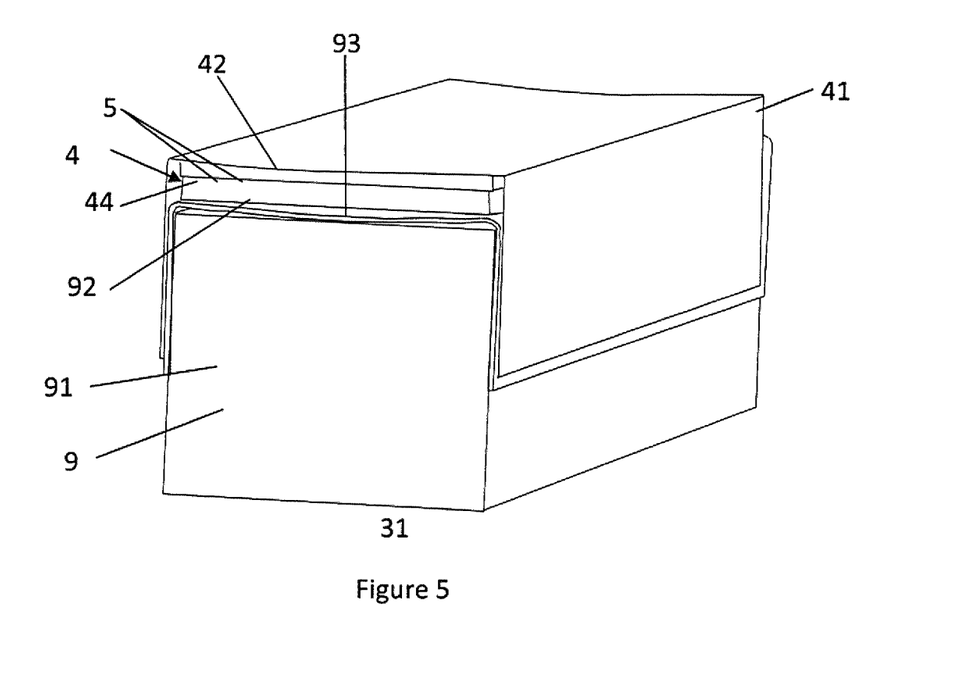
FIG. 5 shows a truncated perspective view of a measuring strip in accordance with one embodiment of the invention.

FIG. 5 is a sectional perspective view of a measuring strip (31). A measuring strip (31) comprises a plurality of temperature sensors (5) distributed over a substrate (44). The substrate (44) facilitates assembly of the contact layer (4) and improves the accuracy of positioning the sensors (5). Advantageously, the substrate (44) is a flexible substrate. The flexibility of the support (44) means that positioning the sensors on the external surface of an end (11) of the tubular component can be facilitated. Assembly may be carried out by bonding or welding. The flexible substrate (44) may, for example, be a polyimide sheet such as Kapton marketed by DuPont.

In a first variation, the contact layer (4) comprises thermistor type temperature sensors (5).

In a second variation, the contact layer (4) comprises thermocouple type temperature sensors (5), for example, thermocouples of the TC2741 type marketed by Minco Products Inc. In this variation, the contact layer (4) may comprise a film thermocouple.

In a third variation, the contact layer (4) comprises microbolometer type temperature sensors (5). Examples are models marketed by INO. The bolometer can be used to measure the temperature from radiation energy. The principle of the bolometer is to convert radiative energy reaching an adsorbent material, generally connected to a thermistor, into an electrical property representative of the radiation. In this latter variation, the contact layer (4) does not need to be in contact with the external surface of the end of the tubular component and can retain an acceptable measuring performance, as bolometers do not have to come into contact with the surface to be measured, since bolometers carry out measurements of infrared emissions. Using a bolometer thus means that problems with measurement quality linked to any geometric defects of the external surface of the end of the tubular component (11) are dispensed with. When bolometers are used, it is not possible to use a protective layer next to the measurement surfaces of microbolometers. If a protective layer is used, this must be perforated so that the microbolometers are not covered. Microbolometer type sensors suffer from a disadvantage compared with thermocouples and thermistors, though, in that they are highly sensitive to dirt.

In another variation, the contact layer (4) may comprise a combination of different types of sensors selected from thermocouples, thermistors and bolometers.

The contact layer (4) represented in FIG. 5 further comprises a protective layer (41) protecting the sensors against wear. The protective layer (41) may be produced in the form of a metal sheet, which provides good protection against shocks, friction and wear. A metallic material is preferred as it is the same material as that for the tubular components and thus behaves in a similar manner in terms of thermal conductivity. The metallic sheet may be thin so as to have a certain flexibility. The metallic sheet (41b) may be shaped so that it has a substantially rounded profile in order to fit better to the rounded contour of the surface of a tubular component.

The contact layer (4) may also comprise a thermally conductive and electrically insulating layer (42) covering the receptor surface of the sensors (5), in a manner such as to be positioned between a sensor and the external surface of the end of the component (11) and in order to conduct heat better towards the sensor. The thermally conductive and electrically insulating layer (42) may be flexible in order to improve the capacity of the measuring means (3) to match the external surface of the tubular component and to ensure optimum coupling between the sensors (5) and the surface to be measured. Examples of suitable materials are the products PC94 and PC93 from t-Global Technology, or else TPCM FSF-52 from Laird Technology.

When a protective layer (41) is present, the thermally conductive and electrically insulating layer (42) is located between the protective layer (41) and the substrate (44).

Figure 6A:
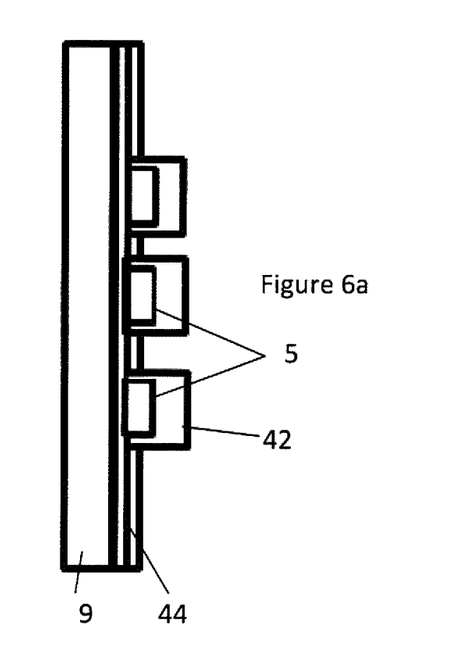
FIGS. 6a and 6b are sectional views of embodiments of measuring strips in accordance with the invention.
Figure 6B:
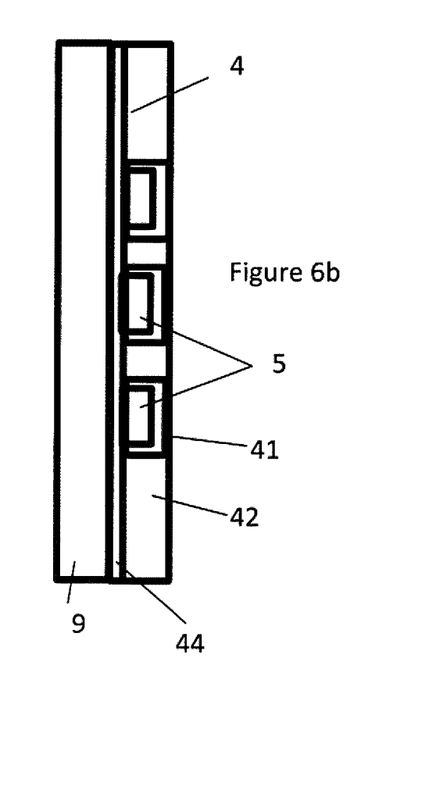

As can be seen in FIG. 6b, the contact layer (4) may also comprise an insulating layer (44) in order to thermally insulate the temperature sensors (5). This insulating layer is disposed in a manner such as to thermally insulate the sensors with the exception of a functional measurement surface and to define a direction of measurement, generally turned towards the surface the temperature of which is to be measured. The insulating layer can be used to improve targeting of the measurement.

In one embodiment, as can be seen in FIG. 5, the device in accordance with the invention may also comprise a cushioning layer (9) between the case (2) and the contact layer (4). This layer has extensible properties and has a certain elasticity; in fact, said cushioning layer (9) acts to maintain contact between the contact layer (4) and the external surface of the end of the tubular component (11), by compensating for dimensional variations of said end, such as variations linked to tolerances in the diameters, or imperfections in the cylindricity.

In a variation, the cushioning layer (9) comprises an elastic material such as silicone or a neoprene foam.

In other variations, the cushioning layer (9) may comprise springs selected from Clover Dome spring rings, corrugated rings, domed springs and garter springs.

The cushioning layer (9) may further comprise, in combination with one of the variations mentioned above, a rigid support (92) between an elastic support, having an elastic structure described above, and the contact layer (4). The rigid support (92) is then located between the elastic support (91) of the cushioning layer (9) and the contact layer (4). This rigid support may have an internal surface (93) which is concave in shape located against the contact layer (4) in order to provide the contact layer (4) with a concave shape which allows the contact layer to match the convex external surface of the tubular surface better.

Figure 4:
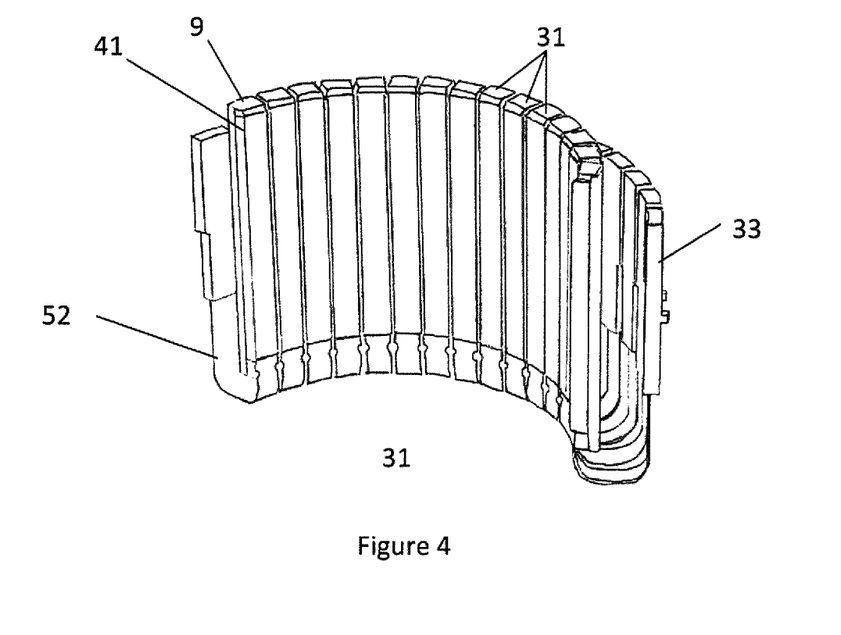
FIG. 4 shows a perspective view of a plurality of measuring means in accordance with one embodiment of the invention.

In the embodiment of the device wherein the measuring strips are shown in FIGS. 4 and 5, the device in accordance with the invention comprises a plurality of measuring means in the form of measuring strips (31) distributed around a circumference surrounding the internal space (20).

Figure 7:
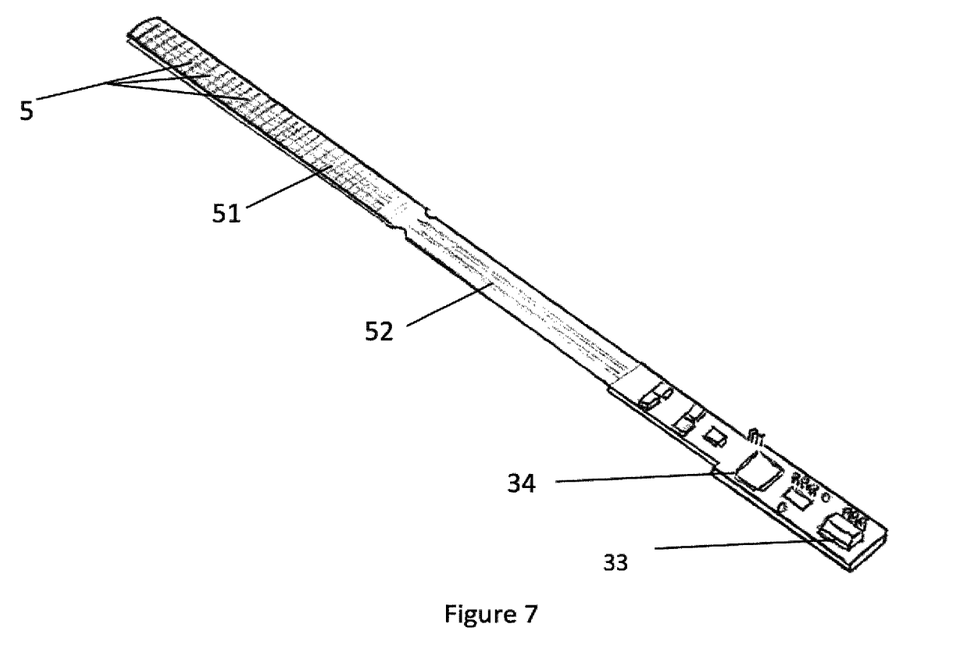
FIG. 7 is a perspective view of a measuring strip and acquisition electronics not mounted on a case, in accordance with one embodiment of the invention.

As can be seen in FIG. 7, each measuring strip (31) of the measuring means (3) comprises a contact layer (4) comprising a plurality of sensors (5) mounted on a support layer (44) intended to measure variables representative of the temperatures at a plurality of points on the external surface of the end of the tubular component (11). This plurality of sensors is organized as an array inside each measuring strip (31) of the measuring means (3). As an example, each array may comprise 8 columns of 32 sensors. In each measuring strip (31), an array (51) of temperature sensors (5) is connected via a flexible connecting strip (52) to an acquisition electronics unit (34). The flexible connecting strip facilitates compact integration of the electronics into the measuring device.

Figure 3:
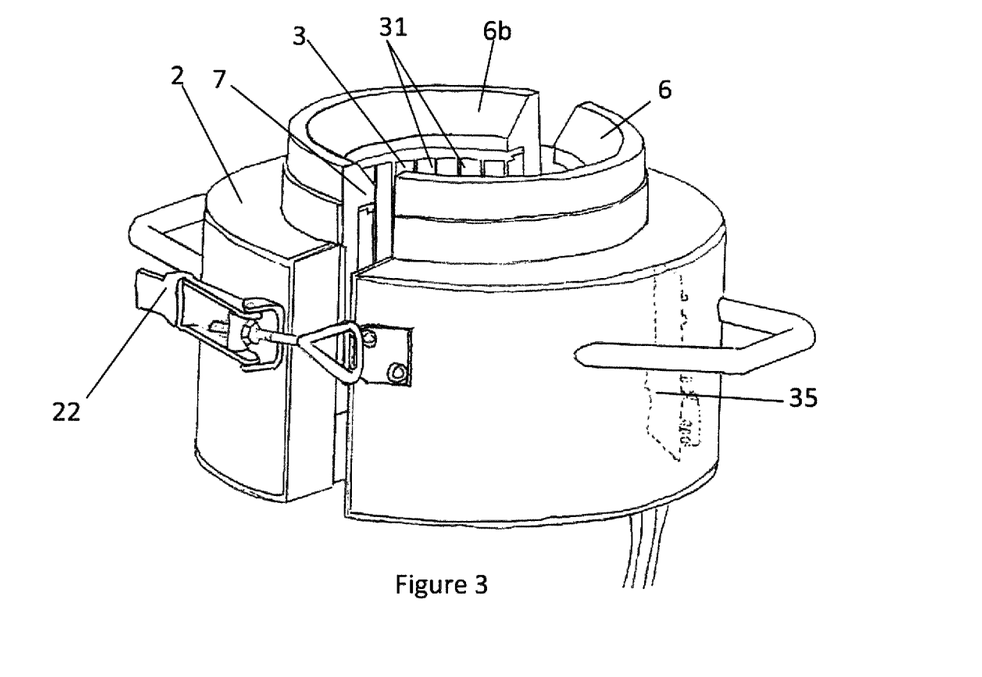
FIG. 3 shows a perspective view of one embodiment of the invention in the closed position.

Each acquisition electronics unit (34) of the device forms part of the first acquisition electronics (33). Each acquisition electronics unit (34) is connected to collection electronics. Thus, the first acquisition electronics comprises one or more acquisition electronic units and collection electronics (35), as seen in FIG. 3.

Each measuring strip (31) comprises a contact layer (4). This means that coupling of the arrays of sensors (5) with the external surface of the tubular component can be improved. This also means that the arrays of sensors can be thermally decoupled from each other, which may be advantageous when resolution is low.

Each measuring strip (31) comprises a cushioning layer (9). This means that the arrays of sensors (5) can be partly separated mechanically in a manner such as to obtain better coupling of each sensor array with the surface of the tubular component to be measured despite geometric imperfections in the component.

In the embodiment of FIG. 5, the cushioning layer (9) comprises a neoprene foam. The cushioning layer (9) also comprises a rigid support (92) in the form of a shaped metallic sheet.

In the embodiment shown in FIGS. 4 and 5, the measuring strips (31) are configured so as to be distributed over a circumference. Alternatively, the measuring strips (31) could be configured in an axial distribution. The embodiment shown is industrially advantageous as it can be used to produce standardized measuring means. The device in accordance with the invention is then adapted to the diameter of the tubular component to be measured by the number of segments (31) installed: the larger the diameter, the more unitarily identical measuring strips (31) may be installed.

Advantageously, the device in accordance with the invention is a stabbing guide and comprises an uppermost portion (6) comprising means for guiding one end of the male component. As an example, this portion comprises an internal conical surface (6b) defining a conical internal space. The portion is said to be "uppermost" because this portion is the portion disposed towards the top during normal use of the stabbing guide on site, a component generally being supplied via the top for making up into a tubular component of the drill string.

The case (2) and at least one measuring means (3) are then included in a lower portion of the stabbing guide and disposed such that the conical internal space (6b) of the upper portion opens into the extension of the internal cylindrical space (20). Thus, the device in accordance with the invention is integrated into a tool the use of which is familiar to the operative on site. Thus, this can simplify on site use of the device in accordance with the invention.

Advantageously, the connecting device in accordance with the invention comprises means for positioning the device in a manner such that the measurement portion is positioned correctly on the external surface of the female end of the component at the level of at least a portion of the threading. The term "at the level of" means an axial position relative to the tubular component such that a radius starting at the axis and passing through this functional portion also passes through the measurement portion "at the level of" the functional portion. Correct and repeatable positioning means that the influence of this positioning on the measurements representing the temperature which are carried out can be minimized. This positioning means may be a positioning abutment (7). To use the device on a threaded and coupled type connection, this positioning abutment (7) may be configured in a manner such as to bear on the field end of the coupling. It will be understood that this abutment may be configured differently depending on the geometries of the connection. If it is an integral connection provided with a thickened portion, the abutment may have a shape which is complementary to the external surface of said thickened portion or of a variation in the external diameter of the connection. Alternatively, the abutment may be replaced by a visual mark which may be used by the operative to axially align the device, for example by placing the visual mark at the height of the end of the female connection.

The device in accordance with the invention may be provided with closure means for closing and keeping the stabbing guide closed around the tubular component, or capable of opening in a manner such as to disengage the device from the tubular component after use. The closure means may be configured in a manner such as to provide the device with a sufficient clamping force to allow the device to be held on the tubular component without external assistance and to ensure contact of the contact layer (4) with the tubular component, in particular by compression of the cushioning layer. The closure means of the device are conventionally those of the stabbing guide already used on site. A closure means may be a toggle fastener (22) of FIG. 3. Alternatively, a fastener may also be a fastener of the type described in the U.S. Pat. No. 4,599,778.

In accordance with an aspect represented in FIG. 7, the connecting device in accordance with the invention comprises first acquisition electronics (33) on each measuring strip (31) connected to a plurality of sensors (5) disposed in the contact layer (4). Preferably, the sensors (5) are disposed in an array of sensors (33).

The first acquisition electronics (33), connected to the sensors (5) of a measuring strip (31), collect the signals from said sensors (33). The first acquisition electronics (33) may comprise on each measuring strip (31), an acquisition electronics unit (34) collecting the signals representative of the temperature of the sensors (5) of the measuring strip (31) on which the unit (34) is disposed; and the first acquisition electronics (33) may then also comprise a collection electronics unit (35) which collects the set of data obtained from the various acquisition electronics units (34). Thus, each acquisition electronics unit (34) is capable of converting signals representative of temperatures obtained from the sensors (33) into a stream of data which is then transmitted to the collection electronics (35) via an asynchronous link. As an example, the asynchronous link is of the RS232 type, and the collection electronics unit (35) is an electronic board of the FPGA type. The first acquisition electronics (33) comprise a supply means for the sensors, an analogue/digital signal conversion module, a processing means and a communication means.

The first acquisition electronics (33) are capable of associating each signal with a position corresponding to the sensor, so as to establish a position-temperature matrix wherein the values T(i,j) are representative of the temperatures measured and wherein i and j are positional indices for the various sensors of the contact layer (4). A position is also designated by means of the location E(i,j).

The first acquisition electronics (33) are connected to the second processing electronics (35) via a communication means. This means may be wired such as an Ethernet link. In this case, it is possible for the electrical supply to the sensors to be made via an Ethernet link in accordance with the PoE principle. Alternatively, this communication means may be wireless. As an example, wifi or Bluetooth protocols may be used. The connecting device may then be provided with batteries in order to power the sensors (5) and the first acquisition electronics (33).

Thus, in practice, acquisition is carried out simultaneously over the set of measuring strips (31) of the device at a specific rate. As an example, the rate may be 3 to 5 frames per second. Each acquisition electronics unit (33) constitutes a single frame. Each single frame is collected by the collection electronics unit (35) which reconstructs an overall frame. Each frame is constituted by the overall matrix collecting the set of values T(i,j) provided by each sensor of each segment. Each overall frame is timed and dated and also contains error indications (acquisition error, sensor failure, failure of a segment, etc). The overall frame may then be used to determine the quality of connection of the tubular components.

This first acquisition electronics may be connected to a system for displaying an image representative of the temperatures of the various locations E(i,j), for example so that the operative can visualize warming during connection.

Alternatively or in a complementary manner, the first acquisition electronics may be connected to second processing electronics.

The principal function of the second processing electronics is to execute functions for determining the appearance of galling. These second electronics may be exported in order to allow more powerful computational means than the autonomous on-board electronics on the case (2) to be used. Another linked advantage is the possibility of using a larger memory which may contain a database composed of critical values for several locations of several models and diameters of threaded connections. These critical values are principally determined experimentally for a series of makeups for various models or diameters of the connection, makeups for which makeup anomalies are generated artificially in order to cause different severities of galling. These critical values may be thresholds which are pertinent to the time functions for the change in the temperatures of the various locations $E(i,j)$ or groups of locations $\Sigma E(i,j)$.

These critical values vary as a function of the material used and the geometries of each connection, which impose conditions as regards friction, such as the coefficient of friction, surface condition, contact pressure, and thus have an influence on the warming that is generated. It is for this reason that it has been necessary to construct a database for the various warming thresholds depending on connection models, in order to render the detection of connection faults more reliable.

In accordance with one aspect of the invention, the second processing electronics (36) may be provided with a time function for measuring the change in temperatures $T(i,j)$, which determines whether a warning of galling will be provided as a function of the change in the temperatures $T(i,j)$. Several time functions are detailed below.

A detection function may also be used, not only for each location $E(i,j)$, but for contiguous sets of locations $\Sigma E(i,j)$ so as to apply the function to zones of the connection and not to precise locations. This means that the threshold function can not only detect galling during assembly, but also can qualify the severity of galling by determining a size for the zone exhibiting abnormal warming.

To this end, in practice, the surface to be measured is divided into sectors $S_k$. Each sector $S_k$ contains a set of sensors $C(i,j)$ corresponding to the locations $E(i,j)$ of the group $\Sigma E(i,j)$. The mean of the temperature $T_k$ on each sector is calculated on the basis of the values $T(i,j) \subset S_k$.

It is also possible to section the surface to be measured multiple times into sectors $S_k$ to cut out different sizes of sectors.

A first sectioning may be made into rectangular sectors $S_k$ with a width corresponding to the width of a thread and a length corresponding to a width of a measuring strip. A second sectioning may be carried out into rectangular sectors $S'_k$ with a width corresponding to the width of 5 threads and a length corresponding to a width of a measuring strip. These examples are illustrative, but the sectors may be defined by any shape which is suitable for the connection model on which the measurements are carried out.

In a first variation, the second processing electronics (36) are provided with a threshold function. The temperature measured at a location $E(i,j)$ of the surface by the measuring means (3) varies between an initial temperature $T(i,j)[t_0]$ at the start of connection and the temperature $T(i,j)[t]$ during makeup at the time $[t]$. When the temperature $T(i,j)[t]$ reaches or exceeds $T(i,j) [t_0]+\Delta T_{threshold}(i,j)$, the device sends the information to the user that galling is occurring.

In a simple approach, satisfactory results have been obtained by fixing this threshold value $\Delta T_{threshold}$ to 10° C. at the threading. Satisfactory results have been obtained by fixing this threshold value at 3° C. or at 6° C. at a sealing surface.

As an example, with a connection having, for a location $E(i,j)$, an initial temperature of 30° C. before makeup on an external surface portion of the component facing the threading, reaching a value of 40° C. or more at the same location $E(i,j)$ can be interpreted to be due to the occurrence of galling at the level of a thread.

It should also be understood that the threshold value is dependent on the location $E(i,j)$ under consideration, in that it corresponds to a surface facing a perfect thread, a vanishing thread, a sealing surface or an abutment.

In another variation, the rate of variation of temperature $V_T(i,j)$ is calculated and when the rate of variation exceeds a predefined threshold $\Delta V_T(i,j)$ for a minimum number of values $V_T(i,j)$ of a zone $\Sigma E(i,j)$, a galling warning is provided. The threshold $\Delta V_T(i,j)$ is defined as a function of the connection, optionally of the rate of makeup. As an example, it will be understood that a small diameter tube can be made up more quickly than a large diameter tube.

In another variation, threshold functions on the variation of temperature and the rate of variation of temperature such as those described above may be used in parallel or in combination in order to detect the appearance of galling.

In another embodiment, the detection algorithm is combined with detection of the torque per turn in order to further improve the accuracy of detection.

The invention claimed is:

1. A device for determining a connection quality of threaded tubular components, comprising:
    a case comprising a cylindrical internal space having an axis and configured to be mounted on an external surface portion of one of the threaded tubular components;
    at least one measuring means between the case and the internal space, comprising a contact layer comprising a plurality of temperature sensors arranged in order to generate signals representative of temperatures at a plurality of locations $E(i,j)$ of the external surface of an end of the tubular component;
    first acquisition electronics connected to the plurality of temperature sensors and configured to process at least a portion of the signals generated by the temperature sensors in order to determine the connection quality.

2. The device as claimed in claim 1, wherein at least one measuring means comprises a plurality of measuring strips distributed about the axis of the device.

3. The device as claimed in claim 1, wherein the device is a stabbing guide for tubular components for oil operations.

4. The device as claimed in claim 1, wherein the temperature sensors are selected from thermocouples, thermistors and microbolometers.

5. The device as claimed in claim 1, wherein the temperature sensors are distributed in arrays of temperature sensors on a flexible substrate.

6. The device as claimed in claim 5, wherein the temperature sensors are thermistors and the flexible substrate is formed from polyimide.

7. The device as claimed in claim 1, wherein the contact layer comprises a thermally conductive and electrically insulating layer disposed at least in part between the temperature sensors and the internal space.

8. The device as claimed in claim 1, wherein the contact layer comprises a protective layer disposed so as to protect the temperature sensors.

9. The device as claimed in claim 8, wherein the protective layer is a sheet of steel shaped to provide a rounded profile.

10. The device as claimed in claim 1, wherein the device comprises a cushioning layer between the case and the contact layer.

11. The device as claimed in claim 10, wherein the cushioning layer comprises elastic means selected from garter springs, Clover Dome spring rings, corrugated rings, a domed spring, an elastic material, and a neoprene or silicone foam.

12. The device as claimed in claim 10, wherein the cushioning layer comprises a rigid profiled element.

13. The device as claimed in claim 1, wherein the case comprises a positioning abutment.

14. The device as claimed in claim 1, wherein the first acquisition electronics comprises a plurality of acquisition electronics units connected to collection electronics of the FPGA programmable electronic circuit type.

15. The device as claimed in claim 14, comprising second processing electronics capable of determining the appearance of galling or the deterioration of at least a portion of an element of a tubular connection during makeup of two threaded tubular components in accordance with at least one time-based detection function.

16. The device as claimed in the claim 15, wherein the first acquisition electronics and the second processing electronics are connected via a wireless wifi or Bluetooth link or a wired Ethernet type link.

17. The device as claimed in claim 15, wherein the second processing electronics comprise software for processing and storing the measurements.

18. A method using the device as claimed in claim 1, comprising the steps of:
   determining a set of values $T_0(i,j)$ which are representative of temperatures at a plurality of locations $E(i,j)$ of the external surface of one end of a tubular component at the start of making it up with another corresponding tubular component;
   determining another set of values $T(i,j)$ representative of temperatures at a plurality of locations $E(i,j)$ of the external surface of one end during makeup;
   calculating the difference between the temperature during makeup $T(i,j)$ and the temperature at the start of makeup $T_0(i,j)$ for each location $E(i,j)$;
   issuing a diagnosis of galling when the difference $T_0(i,j)-T_0(i,j)$ exceeds a predefined threshold $\Delta T_{threshold}(i,j)$ for at least one location $E(i,j)$.

19. The method as claimed in claim 18, comprising the step of:
   computing the rate of variation of temperature $V_T(i,j)$ for at least one set of locations $\Sigma E(i,j)$;
   issuing a diagnosis of galling when the variation in temperature $V_T(i,j)$ exceeds a predefined threshold of variation $\Delta V_T(i,j)$.

* * * * *

UNITED STATES PATENT AND TRADEMARK OFFICE
CERTIFICATE OF CORRECTION

| | | |
|---|---|---|
| PATENT NO. | : 10,760,360 B2 | Page 1 of 1 |
| APPLICATION NO. | : 16/339604 | |
| DATED | : September 1, 2020 | |
| INVENTOR(S) | : Gabriel Roussie et al. | |

It is certified that error appears in the above-identified patent and that said Letters Patent is hereby corrected as shown below:

In the Specification

In Column 5, Line 21, delete "no" and insert -- to --;

In the Claims

In Column 13, Line 18, Claim 16, delete "in the" and insert -- in --;

In Column 14, Line 17, Claim 19, delete "method as claimed in claim 18," and insert -- device as claimed in claim 18 --.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*